United States Patent [19]
Ricker et al.

[11] Patent Number: 5,617,981
[45] Date of Patent: Apr. 8, 1997

[54] RAILING ROOF RACK FOR A VEHICLE

[75] Inventors: Erhard Ricker, Rodgau; Bruno Kroll, Radevormwald; Wolfgang Isokeit; Volker Scheibe, both of Rodagau; Gunther Heim, Obertshausen, all of Germany

[73] Assignee: YMOS Aktiengesellschaft Industrieprodukte, Obertshausen, Germany

[21] Appl. No.: 390,489

[22] Filed: Feb. 17, 1995

[30] Foreign Application Priority Data

Feb. 17, 1994 [DE] Germany ............... 44 05 072.0

[51] Int. Cl.⁶ .................. B60R 9/00; B60R 9/04
[52] U.S. Cl. .............. 224/309; 224/322; 224/326
[58] Field of Search .................. 224/309, 321, 224/322, 325, 326

[56] References Cited

U.S. PATENT DOCUMENTS

| | | | |
|---|---|---|---|
| 4,279,368 | 7/1981 | Kowalski | 224/326 |
| 4,341,332 | 7/1982 | Kowalski et al. | 224/326 |
| 4,815,643 | 3/1989 | Heideman | 224/326 |
| 4,834,448 | 5/1989 | Sakamoto et al. | 224/309 |
| 5,497,924 | 3/1996 | Fisch et al. | 224/326 |

FOREIGN PATENT DOCUMENTS

| | | |
|---|---|---|
| 3230346 | 2/1984 | Germany. |
| 4223898 | 1/1994 | Germany. |

*Primary Examiner*—Henry J. Recla
*Assistant Examiner*—Timothy L. Maust
*Attorney, Agent, or Firm*—W. G. Fasse; W. F. Fasse

[57] ABSTRACT

A roof rack is constructed of two railing rods securable to a vehicle roof. Each railing rod is cut from tubular sectional stock. The rod ends are bent and flattened to form two mounting feet, one at each rod end and integral with the railing rod. A connector element such as a screw passes through the respective mounting foot. Each mounting foot is enclosed by at least one enclosure. Preferably the enclosure has two sections such as a shell and a cover. The sections are strengthened by ribs and the cover snaps onto or into the shell with a location fit. At least one enclosure section is made of synthetic material. The load is carried by the integral mounting feet, whereby the enclosures are substantially load free.

19 Claims, 5 Drawing Sheets

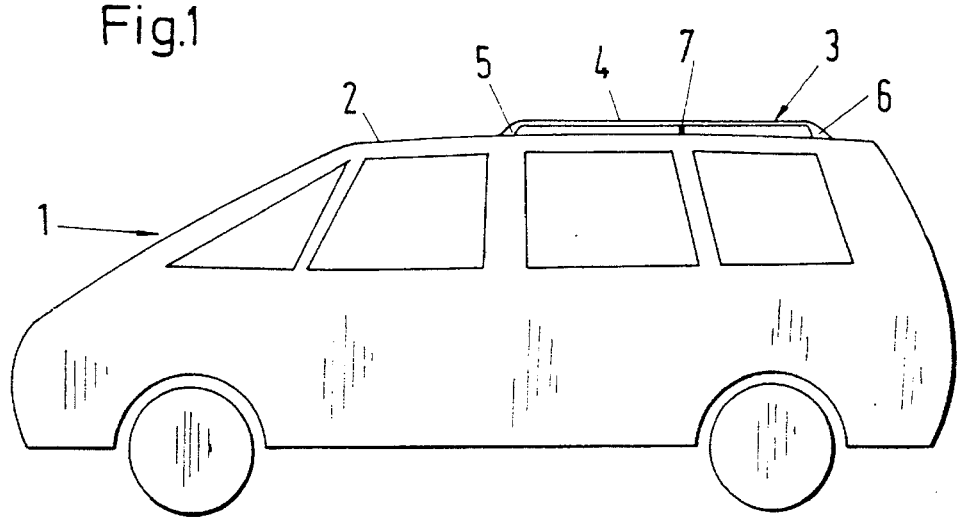
Fig.1
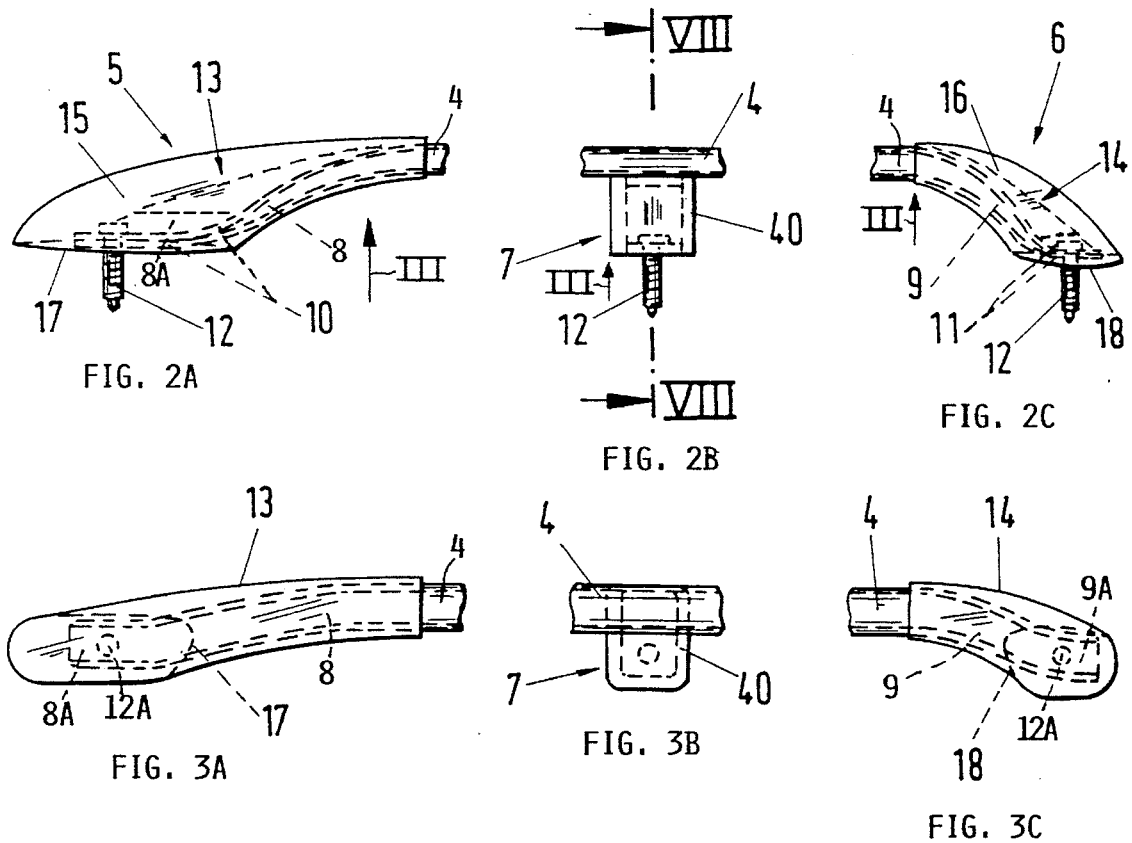
FIG. 2A
FIG. 2B
FIG. 2C
FIG. 3A
FIG. 3B
FIG. 3C

RAILING ROOF RACK FOR A VEHICLE

FIELD OF THE INVENTION

The invention relates to a railing roof rack for a vehicle, especially a station wagon, mini-van or the like. Such roof racks are made of railing sections or railing rods that are secured to the roof by a mounting foot. One mounting foot is provided at each end of each railing rod. The mounting feet support the railing rods on the vehicle roof.

BACKGROUND INFORMATION

German Patent Publication DE 3,203,346 A1 (Klopp et al.) discloses a carrier body for supporting a roof railing on a vehicle roof. Each railing rod is supported at each of its ends by a separate carrier body comprising at least two sections having a longitudinal interface for interconnecting the sections. The railing rod itself is a hollow tubular section, the ends of which are not deformed. Rather, each rod end is received in a horizontally facing socket of the respective separate carrier body. The carrier bodies at each end keep the railing rod spaced upwardly from the roof surface. Each carrier body or mounting foot comprises a flat smooth outer surface and hollow spaces reinforced by inner ribs formed by sections made of synthetic material. The sections are assembled in the form of a shell and a cover to form a closed component, whereby the sections have projections and recesses that are complementary to each other so that the two sections can be attached to each other by interlocking snap locks. Additionally, the carrier or mounting feet may be enclosed by a casing. A securing device is provided on the side of the mounting foot facing the roof surface, for example, in the form of a threaded bore or a threaded insert into which a mounting screw is screwed, whereby the mounting screw extends through the vehicle roof or through a roof reinforcing member.

The just described conventional mounting feet for roof racks must be of stable, solid construction because the entire weight is taken up by the mounting feet. Thus, the mounting feet are either entirely solid or are reinforced by ribs to be able to take up the stress caused by the loads carried by the roof rack. Such constructions involve a substantial effort and expense for producing the mounting feet.

German Patent Publication DE-OS 4,223,898 A1 (Lumpe et al.) discloses a roof rack railing, the ends of which are bent over and widened out to form a mounting foot by fitting a mounting insert into the widened railing end. Such a construction poses a problem because the railing end itself can be secured to the roof surface only through the insert. To solve the problem Lumpe et al. disclose an insert that is shaped to fit into the widened bend end of the railing. The insert in turn is provided with a threaded bore for securing the insert to the vehicle roof. However, the connection between the insert and the railing appears to rely solely on a location fit between the inner surface of the widened railing end and the respective insert. Such a connection may not be satisfactory where the roof rack is intended for carrying substantial loads.

OBJECTS OF THE INVENTION

In view of the above it is the aim of the invention to achieve the following objects singly or in combination:

to construct a vehicle roof rack in such a manner that more favorable load conditions are provided;

to avoid a mere location fit between the railing proper and an insert connected to the vehicle roof;

to simplify the mounting of the railing ends to the roof while still assuring a positive load introduction into the roof structure;

to achieve an improved mounting for a roof rack while reducing the production effort and expenses;

to directly connect the railing rod end to the roof structure and then cover the connection with an enclosure that substantially does not participate in the force transmission; and to use railing rods that have a tubular cross-section with a laterally open guide track for the insertion of the ends of cross bars for carrying different types of loads, such as skis, roof trunks, bicycles, surfing boards, and the like, whereby the ends of the cross bars are slidable with the aid of slide pieces along the guide tracks in the two railing rods and the slide pieces can be anchored in the guide tracks of the railing rods.

SUMMARY OF THE INVENTION

The roof rack according to the invention comprises at least two railing rods of identical construction. Each railing rod has two ends which are bent and flattened so that the rod and its two feet are a one-piece structure to be secured to the vehicle roof. Each mounting foot forms an integral bent and flattened extension of the respective rod end. A foot enclosure is constructed for at least partly enclosing each mounting foot that its an integral extension of the respective railing rod. The railing rod itself is a tubular section cut from, for example, extruded metal stock. The bent and flattened rod ends form the respective mounting foot at each end of the railing rod and each mounting foot forms a supporting core inside its respective foot enclosure.

By forming the foot as an integral part of the railing rod a very sturdy construction is achieved since a connecting device, such as a screw, may pass directly through the flattened end of the rod. As a result, the roof rack according to the invention is very stable for a wide range of loads while being altogether of a simple construction. The enclosure of the mounting foot can provide the desired smooth surface and the desired shape.

Further, the metallic railing rod can have any desired or suitable tubular sectional configuration between the bent and flattened ends, whereby the tubular cross-section may even be provided with an outwardly or rather laterally open groove providing a guide track having, for example, a dovetailed or similar cross-section in which slide pieces are received that forms the ends of cross bars so that different cross bars may be inserted for different loads, such as skis, roof cases, bicycles, surfing boards, or the like, whereby the slide pieces are merely inserted into the guide groove or track and anchored therein when the cross bar has been pushed into the desired position. The single piece construction of the railing rods and the mounting feet provides a safe load carrying capability in addition to a structural simplification which in turn reduces the manufacturing cost while still assuring a simple, yet sturdy mounting.

BRIEF DESCRIPTION OF THE DRAWINGS

In order that the invention may be clearly understood, it will now be described, by way of example, with reference to the accompanying drawings, wherein:

FIG. 1 shows a side view of a mini-van or station wagon equipped with a roof rack according to the invention;

FIG. 2A shows a perspective view of a left-hand end of a mounting construction for a rack railing rod;

FIG. 2B shows a central mounting for the railing rod;

FIG. 2C shows a perspective view of a right-hand mounting construction for the railing rod;

FIG. 3A, 3B, and 3C show views corresponding to FIGS. 2A, 2B and 2C respectively as viewed in the direction of the arrow III in FIGS. 2A, 2B, and 2C respectively;

Figure 4:
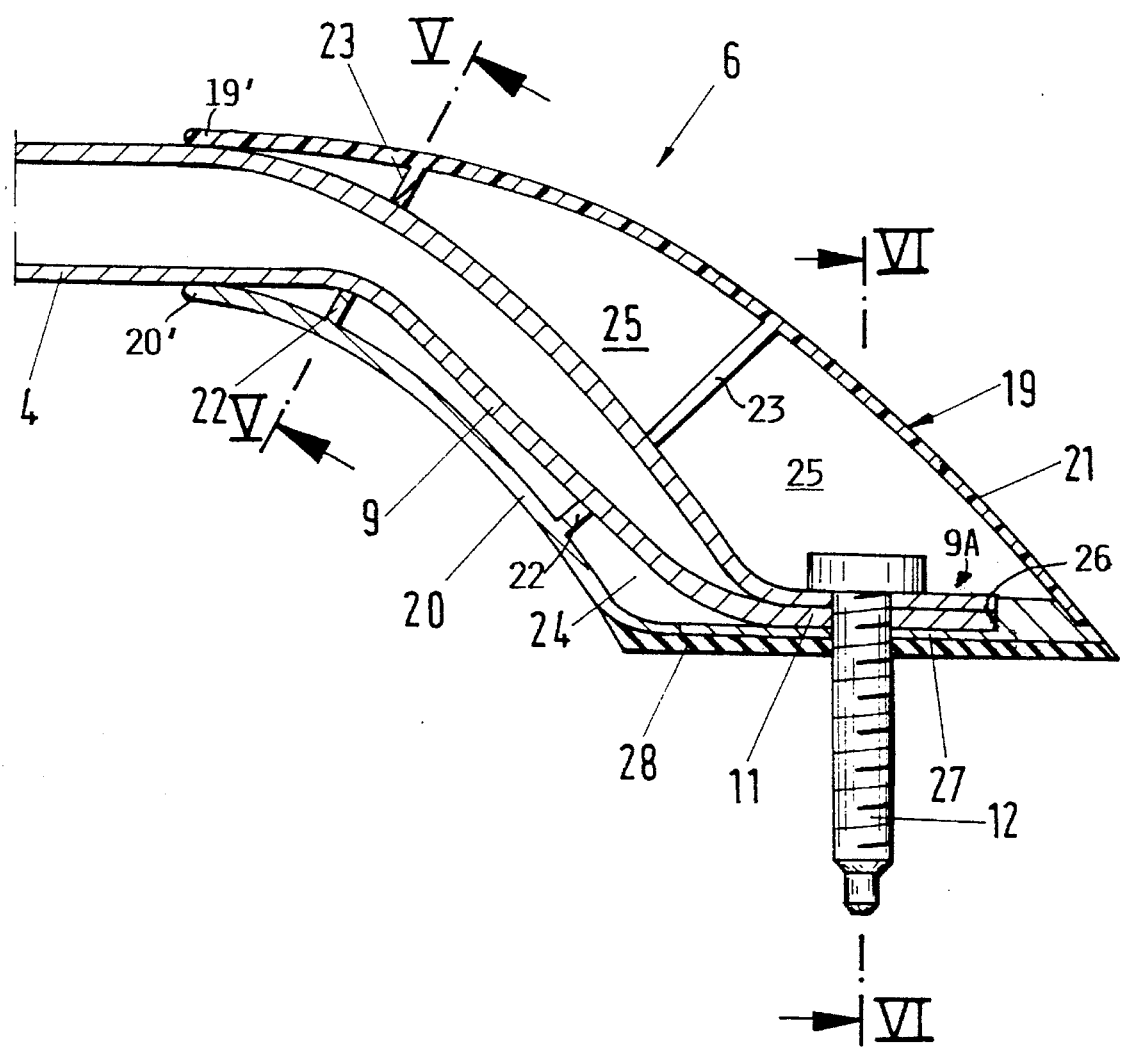
FIG. 4 shows a sectional view through the longitudinal axis of the right-hand end construction of FIG. 2C, whereby the enclosure of the mounting foot is shown as having two enclosure sections.

DETAILED DESCRIPTION OF PREFERRED EXAMPLE EMBODIMENTS AND OF THE BEST MODE OF THE INVENTION

FIG. 1 shows a vehicle 1 with a roof 2 carrying a roof rack 3. The roof rack 3 comprises at least two longitudinally extending railing rods 4, only one of which is shown in FIG. 1. All railing rods are of the same construction. The railing rod 4 is mounted to the roof 2 through a forward or left-hand mounting foot 5, through a rear or right-hand mounting foot 6 and through a support mount 7 positioned between the end mounting feet 5 and 6.

As shown in FIGS. 2A, 2B, 2C and 3A, 3B, and 3C, the railing rod 4 is a sectional tubular member having two ends 8 and 9 which are bent and flattened to form a mounting foot 5, 6 respectively. The mounting foot 5 has a flat portion 8A. The mounting foot 6 has a flat portion 9A. These flat portions 8A and 9A each have at least one hole 12A for a mounting screw 12. By bending and flattening the rod ends 8 and 9 the feet 5 and 6 with their respective flat portions 8A and 9A are formed as integral components of the railing rod 4.

The flat portions and the bent portions comprise two layers 10 and 11 respectively which results in a sturdy construction in which the screw 12 can either be mounted rotatably or in a fixed position. For example, the screw head can be welded to the flat portion 8A, 9A.

As seen in FIGS. 2A, 2C, 3A, and 3C, the mounting feet 5 and 6 are enclosed by respective enclosures 13 and 14, preferably constructed as envelopes or as respective molded members preferably made of synthetic material or sheet metal. The molded members 15 and 16 have a respective downwardly facing roof contacting mounting surface 17 and 18 through which the screw 12 extends. Due to the flattening of the ends of the railing rod, the invention achieves a large contact surface at 8A and 9A which is fully accommodated by the respective foot enclosure so that in spite of using, for example a railing rod 4 of circular cross-section, a desirably large roof contact surface is obtained. The molded members 15 and 16 are single-piece elements which are rigidly connected to the railing rod 4. Thus, in this embodiment the screw 12 is secured to the flat portion 8A, 9A respectively against rotation. When the railing is attached to a roof, the screws 12 pass through the roof and a nut not shown is secured to the respective screw 12 from the inside of the vehicle.

FIGS. 2B and 3B will be described below in connection with FIGS. 8 to 11 showing details of central mountings positioned along the respective railing between the ends thereof.

Figure 5:
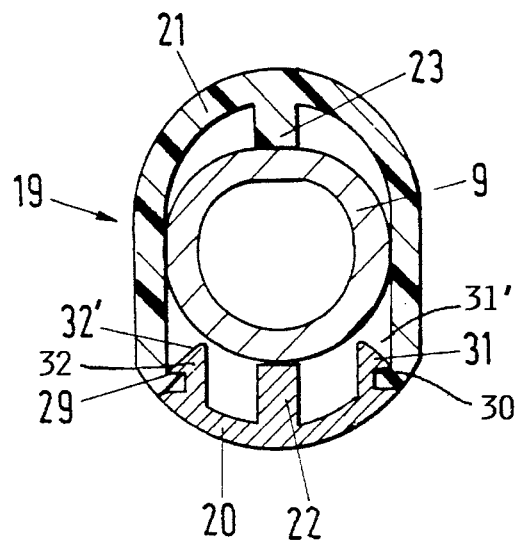
FIG. 5 is a sectional view along section line V—V in FIG. 4.
Figure 6:
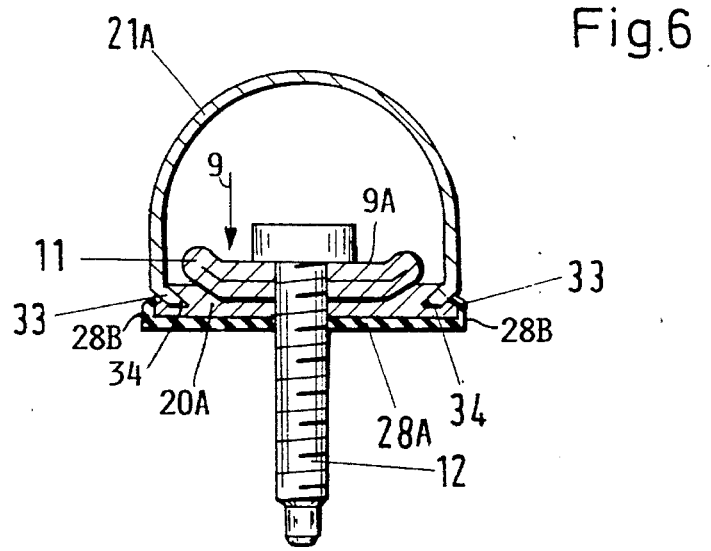
FIG. 6 is a sectional view along section line VI—VI in FIG. 4.

FIGS. 4, 5 and 6 illustrate a modified embodiment of a molded member forming an enclosure 19 for the mounting foot 6. The enclosure 19 comprises a lower section 20 forming a shell and an upper section 21 forming a cover. Both the shell 20 and the cover 21 are preferably made of synthetic material or sheet metal. However, it is possible to make one section of synthetic material while the other section is made of metal. For example, the cover section may preferably be made of metal, such as an aluminum alloy. The shell 20 is provided with reinforcing ribs 22. The cover 21 is provided with reinforcing ribs 23. The ribs 22 bear against the downwardly facing portion of the bent end 9 of the rod 4 and enclose hollow spaces 24. The ribs 23 bear against the upwardly facing surface of the bent portion of the rod end 9 and enclose hollow spaces 25. Preferably, both layers 11 of the flat end portion 9A bear against a shoulder 26 of the lower foot portion 27 of the shell section 20 of the enclosure 19.

The shell shaped lower section 20 with its foot portion 27, except for the shoulder 26, and the cover section 21 of the enclosure 19 are relatively thin-walled and thus of a light-weight construction because these sections do not have to participate in transmitting the load caused forces into the vehicle roof. The upper rim 20' of the shell section 20 and the upper rim 19' of the cover section 21 reach preferably to a portion of the rod 4 which is not bent so that the entire bent portion of the rod end 9 is received within the enclosure. Further, the rims 20' and 19' are sealed against the outer surface of the rod 4, if necessary with an additional sealant not shown.

It is preferred to provide a washer type member 28 below the foot portion 27 of the shell section 20. The foot portion 27 extends into the shoulder 26 that forms an integral part of the foot portion 27. The washer type member 28 is thus an element separate from the shell 20 and from the cover 19 and is preferably made of a synthetic or rubber type material that forms the required seal for the mounting. The screw 12 in FIG. 4 is a rotatable screw because the cover 21 may be snapped in place by features shown in FIGS. 5 and 6 to be described below. Thus, the railing rod 4, the shell section 20, and the washer 28 can be tied down with the screw 12, whereupon the cover section 21 is snapped in place onto the shell section 20.

Referring to FIG. 5, the connection of the shell section 20 with the cover section 21 to form the enclosure 19 is accomplished by a symmetrical construction of each section 20 and 21 relative to a vertical central plane, at least of the snap-in portions of these sections 26, 21, whereby both sections can be snapped together by a location or form-locking fit. For this purpose, the cover 21 of the enclosure 19 has substantially an inverted U-cross-sectional configuration with the rib 23 extending in the central plane opposite the rib 22 of the shell 20. Preferably, the ribs 22, 23 contact the rail end 9 to form limit stops. Inwardly directed snap shoulders 29 and 30 along the lower edges of the cover section 21 engage outwardly facing snap shoulders 31 and 32 of the shell section 20. The shoulder 31 has a guide-in ramp 31'. The shoulder 32 has a guide-in ramp 32'. These ramps 31' and 32' cooperate with respective surfaces of the shoulders 29 and 30 for leading the shoulders into the snapped-in position. The assembly is simple because the cover 21 merely needs to be brought into the proper position and pressed downwardly, whereby the guide-in ramps 31' and 32' guide the shoulders 29 and 30 into the snap-in position. It has been found to be sufficient that only one pair of the two snap-in shoulder pairs 29, 32 or 30, 31 needs to be flexibly yielding.

Prior to snapping the cover 21 in place, the screw 12 is caused to pass through a respective hole in the shell 20 and through a hole in the seal washer 28. The screw 12 is then inserted into the opening in the roof 2 and a nut, not shown, is tightened inside the vehicle. Thereafter the cover 21 is snapped in place as described.

FIG. 6 shows a modified cover 21A having inwardly bent elastically yielding edges 33 snapping into grooves 34 of a shell section 20A. The shell section 20A is received in a sealing washer 28A having preferably raised rims 28B. The sealing washer 28A and its rims 28B are made of an elastic material such as rubber. The construction is such, that the interlocking edges 33 of the cover 21A are insertable into the grooves 34 by longitudinally pushing the cover 21A onto the shell 20A after the shell 20A and the flattened portion 9A of the railing end 9 have been secured to the roof.

Figure 7:
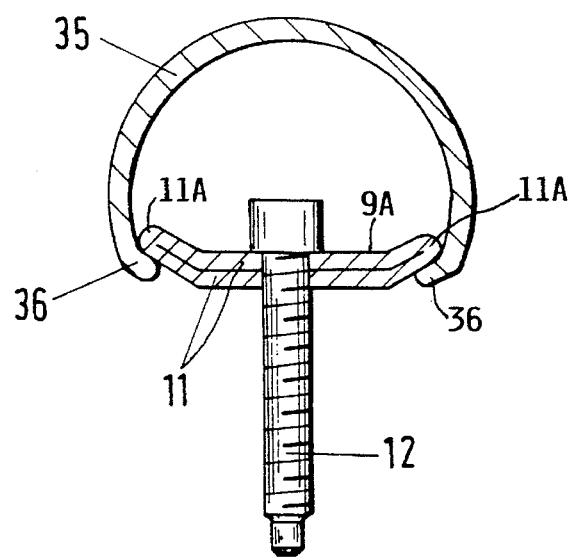
FIG. 7 is a sectional view substantially along the same section line as in FIG. 6, however illustrating a modified single piece, simpler enclosure compared to FIG. 6.

FIG. 7 illustrates a further simplified cover 35 having interlocking edges 36 that cooperate with upwardly bent edges 11A of the flattened portion 9A. A sealing washer will also be used in this embodiment, but is not shown in FIG. 7. The cover 35 may be axially pushed onto the flattened end 9A of the railing rod 4 from the end thereof, after the screw 11 has been tightened. The cover 35 may be made of metal or any suitable plastic material.

Figure 8:
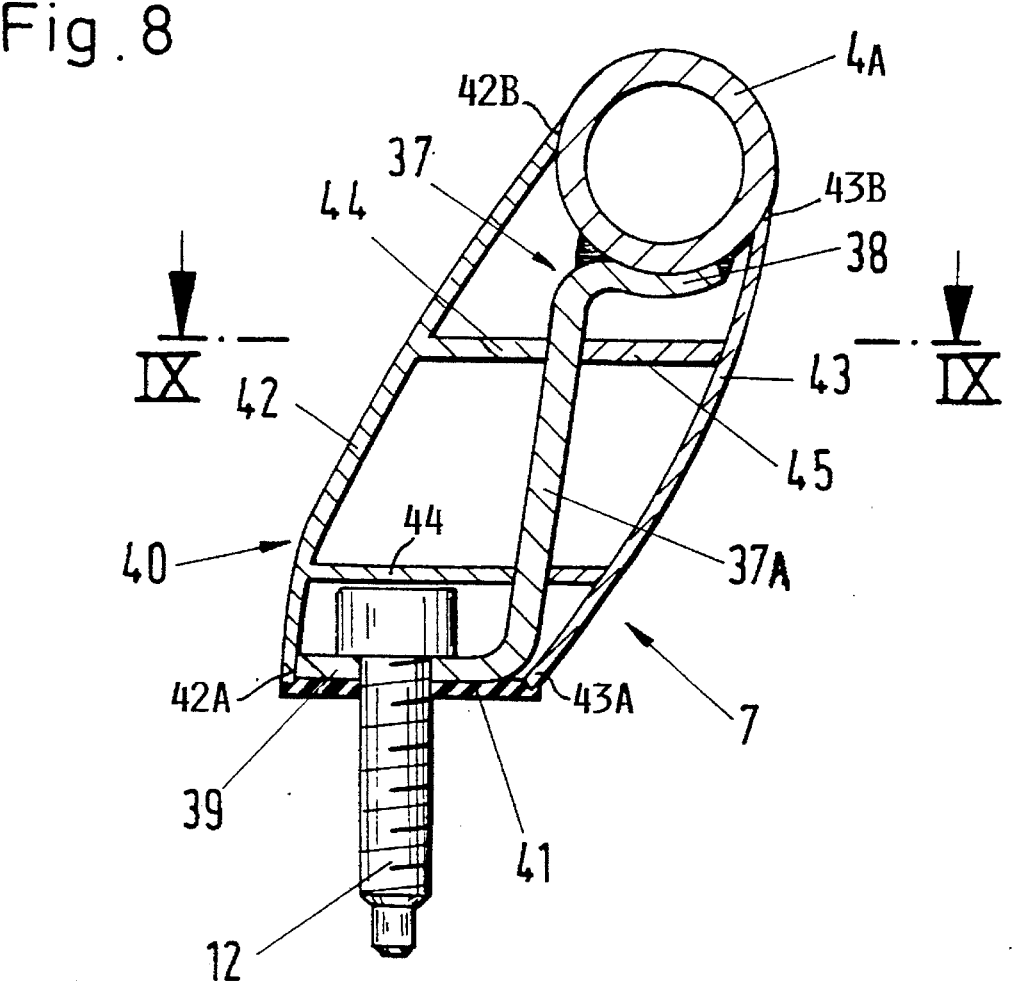
FIG. 8 is a sectional view along section line VIII—VIII in FIG. 2B illustrating the construction of one embodiment of a central mounting positioned between the rod ends.
Figure 9:
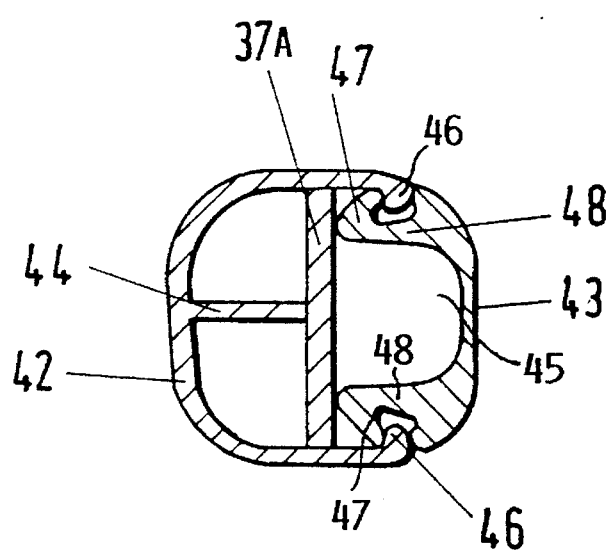
FIG. 9 is a sectional view along section line IX—IX in FIG. 8.

FIGS. 8 and 9 illustrate one embodiment of the intermediate support mount 7 positioned between the rod ends. The support mount 7 comprises a bracing member 37 having a chord 37A with a one-sided upper flange 38 and an oppositely directed one-sided lower flange 39. The flange 38 is secured to a railing rod 4A, for example, by welding or adhesive bonding if the just mentioned components are made of synthetic material. The flange 39 provides the foot that rests on the vehicle roof through a sealing washer 41. The chord 37A extends at an acute angle to the vertical. The mounting screw 12 passes through the foot forming flange 39 and through the washer 41. The bracing member 37 is then closed by a casing 40 that has at least one casing member 42, preferably two casing members 42 and 43 forming a shell cover 42 and a shell 43. The cover 42 and the shell 43 are made either of metal or of synthetic material. The cover 42 comprises reinforcing ribs 44 that bear against the chord 37A on one side thereof. The shell 43 also has reinforcing ribs 45 bearing against the opposite side of the chord 37A, preferably in horizontal alignment with the ribs 44. The lower edge 42A of the cover 42 and the lower edge 43A of the shell 43 bear against the sealing washer 41 to assure a proper seal. The upper edge 42B and the upper edge 43B also bear in a sealed manner against the railing rod 4A. These edges 42B and 43B extend substantially tangentially to the rod 4A.

FIG. 9 shows how the shell 43 and the cover 42 are interlocked by locking shoulders 46 of the cover 42 that engage locking hooks 47 of the shell 43. The hooks 47 are extensions of locking arms 48 of the shell 43 to provide the required elasticity for a snap-in fit. The hooks 47 are so dimensioned that they bear against the chord 37A of the brace 37. Both the shell 43 and the cover 42 have a substantially U-shaped configuration. The just described interlocking is substantially similar to that of FIG. 5.

The mounting of the support mount 7 shown in FIGS. 8 and 9 is accomplished by first securing the brace 37 to the vehicle roof whereby the seal washer 41 is placed between the roof and the foot 39. The shell 43 and cover 42 forming the casing 40 are then engaged with each other to close the casing 40. The screw 12 is rotatably received in the foot 39 and can be tightened prior to snapping the casing 40 in place.

Figure 10:
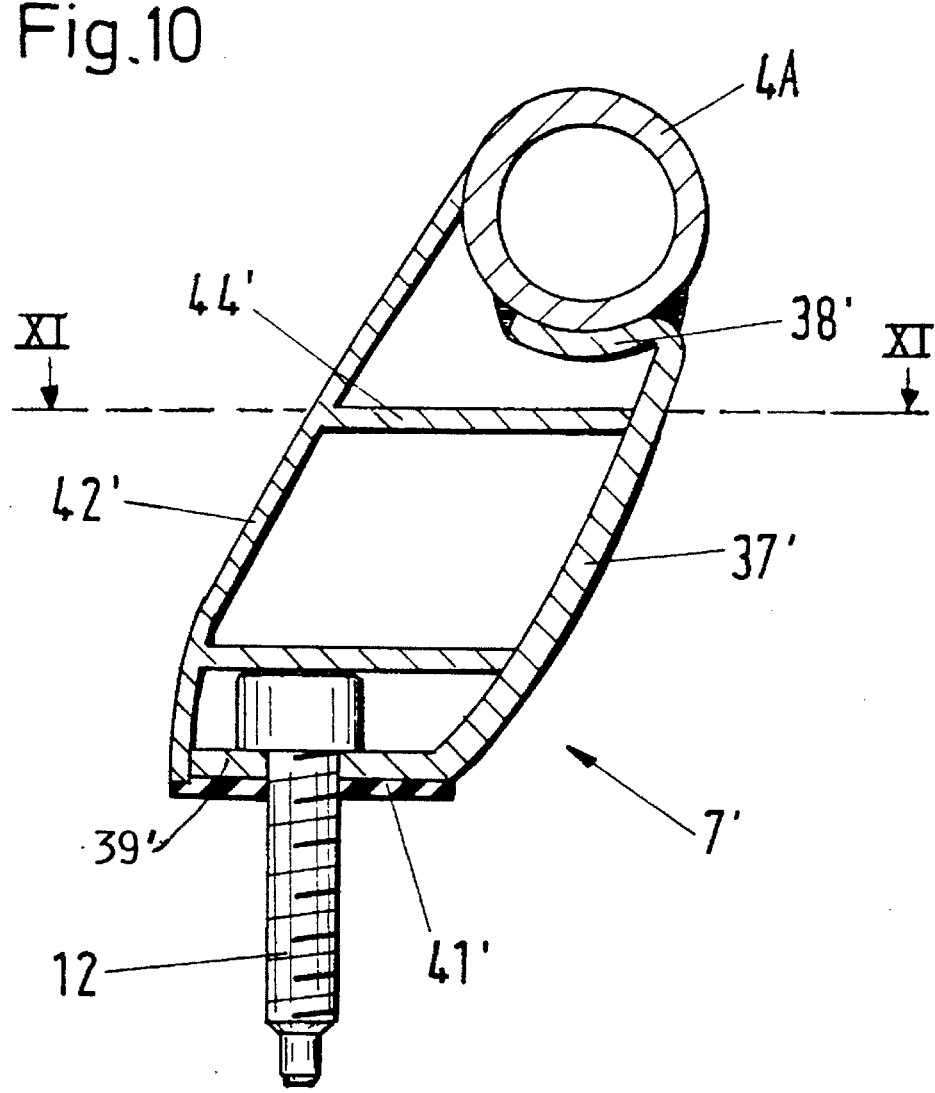
FIG. 10 is a sectional view similar to that of FIG. 8, however showing a modified central mounting.
Figure 11:
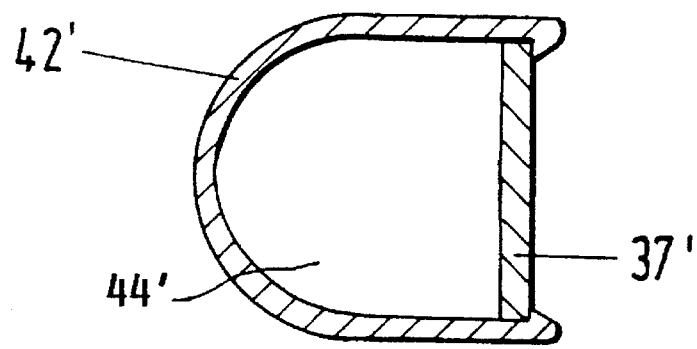
FIG. 11 is a sectional view along section line XI—XI in FIG. 10.

FIGS. 10 and 11 show a simplified embodiment of a support mount 7' compared to FIGS. 8 and 9. The brace 37' forms simultaneously the shell which is closed by a cover 42' having reinforcing ribs 44'. The upper flange 38' extends in the same direction as the lower flange 39'. The upper flange 38' of the brace 37' is welded to the railing rod 4A. However, the brace 37 with its railing rod 4A in FIG. 8 and the brace 37' with its railing rod 4A in FIG. 10 may be cut from extruded stock in which the rod and the brace form a single integral sectional configuration. The screw 12 passes rotatably through the foot 39' and through the sealing washer 41'. After the support mount 7' has been attached to the roof, the cover 42' is snapped in place against the brace 37' as shown in FIG. 11, whereby the rib 44' forms a stop bearing against the brace 37'.

Although the invention has been described with reference to specific example embodiments, it will be appreciated that it is intended to cover all modifications and equivalents within the scope of the appended claims.

What is claimed is:

1. A roof rack comprising a tubular section forming a railing rod having two ends, a bent and flattened mounting foot at each end of said railing rod for securing said railing rod to a vehicle roof, each bent and flattened mounting foot forming an integral part of the respective tubular section, a foot enclosure for at least partly enclosing each bent and flattened mounting foot, so that said bent and flattened mounting foot forms a supporting core inside its respective foot enclosure, and further comprising a separate sealing washer (28, 41) inserted between said foot enclosure and said vehicle roof to seal said foot enclosure.

2. The roof rack of claim 1, wherein said foot enclosure comprises at least one molded member.

3. The roof rack of claim 1, further comprising at least one support mount between said rod ends, said support mount comprising a bracing member for bearing against said vehicle roof and at least one casing for said bracing member.

4. The roof rack of claim 3, wherein said bracing member is a supporting holder secured to said railing rod, and wherein said casing is a further molded member at least partly enclosing said supporting holder.

5. The roof rack of claim 4, wherein said supporting holder is enclosed on one side by said at least one casing.

6. The roof rack of claim 2, wherein said molded member is a hollow section that widens from one of its ends to its other end.

7. The roof rack of claim 1, wherein said molded member comprises two sections interconnected to form said foot enclosure.

8. The roof rack of claim 7, wherein one of said two sections is formed as a shell and the other section is formed as a cover for said shell.

9. The roof rack of claim 1, wherein said foot enclosure comprises a wall section reaching under said bent and flattened mounting foot, said wall section being substantially flat for resting on a roof surface with said sealing washer inserted between said substantially flat wall section and said roof surface.

10. A roof rack comprising a tubular section forming a railing rod having two ends, a bent and flattened mounting foot at each end of said railing rod for securing said railing rod to a vehicle roof, said bent and flattened mounting foot forming an integral extension of the respective rod end, a foot enclosure for at least partly enclosing each bent and flattened mounting foot, so that said bent and flattened mounting foot forms a supporting core inside its respective foot enclosure, wherein said foot enclosure comprises at least one molded member comprising two sections interconnected to form said foot enclosure.

11. The roof rack of claim 10, wherein one of said two sections is formed as a shell and the other section is formed as a cover for said shell.

12. The roof rack of claim 10, wherein said foot enclosure comprises a wall section reaching under said bent and flattened mounting foot, said wall section being substantially flat for resting on a roof surface.

13. The roof rack of claim 10, further comprising at least one support mount between said rod ends, said support mount comprising a bracing member for bearing against said vehicle roof and at least one casing for said bracing member.

14. The roof rack of claim 13, wherein said bracing member is a supporting holder secured to said railing rod, and wherein said casing is a further molded member at least partly enclosing said supporting holder.

15. The roof rack of claim 14, wherein said supporting holder is enclosed on one side by said at least one casing.

16. The roof rack of claim 10, wherein said molded member has a configuration that widens from one end to the other.

17. The roof rack of claim 10, further comprising a separate sealing washer (28, 41) inserted between said foot enclosure (19, 40) and said vehicle roof.

18. The roof rack of claim 10, wherein said foot enclosure is made, at least partly, of synthetic material.

19. The roof rack of claim 10, further comprising a connector for securing each mounting foot of said railing rod to said vehicle roof.

* * * * *